Figure 1A:
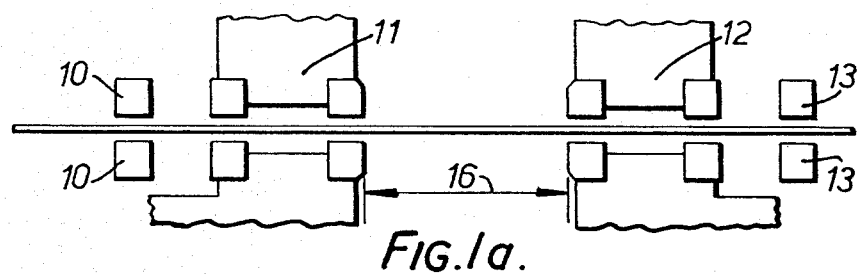

United States Patent [19]
Clews

[11] 3,916,140
[45] Oct. 28, 1975

[54] METHOD OF AND APPARATUS FOR STRIP FLASH WELDING

[75] Inventor: John Colin Clews, Dudley, England

[73] Assignee: British Federal Welder and Machine Company Limited, England

[22] Filed: Apr. 15, 1974

[21] Appl. No.: 460,703

Related U.S. Application Data

[63] Continuation of Ser. No. 291,092, Sept. 20, 1972, abandoned.

[30] Foreign Application Priority Data

Sept. 22, 1971  United Kingdom............... 44094/71

[52] U.S. Cl. .................... 219/100; 29/488; 219/97; 219/105
[51] Int. Cl.² ........................................ B23K 11/04
[58] Field of Search ........ 29/488; 219/97, 100, 101, 219/105

[56] References Cited

UNITED STATES PATENTS

| | | | |
|---|---|---|---|
| 2,735,170 | 2/1956 | Moffatt | 29/488 |
| 2,787,698 | 4/1957 | Schlatter et al. | 219/97 X |
| 3,400,449 | 9/1968 | Maguire et al. | 29/488 X |
| 3,808,393 | 4/1974 | Goodwin et al. | 219/97 |

*Primary Examiner*—J. V. Truhe
*Assistant Examiner*—N. D. Herkamp
*Attorney, Agent, or Firm*—William R. Woodward

[57] ABSTRACT

A method of and apparatus for welding metal strips in which the strip ends are cleaned, to ensure good welding conditions, prior to being sheared and welded, the three operations taking place in a clamp position.

10 Claims, 7 Drawing Figures

METHOD OF AND APPARATUS FOR STRIP FLASH WELDING

This is a continuation of application Ser. No. 291,092, filed Sept. 20, 1972, now abandoned.

This invention relates to strip line flash welding machines.

Strip line flash welding machines are used to connect together metal strips that are then supplied as a continuous metal strip for further processing and manufacture. The welding operation must be carried out quickly and must provide welds of a uniformly high standard. The normal preparation for the welding of strip includes shearing the ends of the old and new strips in a line away from the welding machine and abutting these surfaces against a gauge bar. The alignment of the strip ends with the gauge bar is critical for satisfactory welding results and is under the control of the operator thus leading to lack of consistency between successive welds.

The inclusion of flash welding facilities for coil joining operations in continuous pickle lines involves the siting of the flash welder at the entry section of the line, with the strip being joined prior to its transfer through the continuous pickling system.

At the point where the weld is made therefore, surface scale is still present on the strip.

This scale, being more resistive than steel, tends to impede the passage of current into the strip during the welding operation, and in addition, causes high temperatures to be reached on the surface of the material which leads to pitting and erosion of the die surfaces of the machine.

The thickness and adhesion of the scale is not controlled and the presence of this scale therefore introduces a variable into the welding operation and causes difficulty in the production of consistent high quality welds.

U.S. Pat. application Ser. No. 209,274, to Goodwin et al., filed Sept. 20, 1972, owned by the assignee of the present application, discloses an improved and simplified operation for joining metal strips to further improve the welding operation.

The present invention is a method of welding metal strips in a strip line flash welder, including locating and clamping the ends of metal strips in a clamp position, cleaning and shearing the ends of the strips and welding the sheared strip ends in the clamp position.

The present invention is also a strip line flash welder having clamps operable to clamp the ends of metal strips in a clamp position means operable to clean the strip ends, and shear means operable to shear the strip ends between the clamps.

Embodiments of the present invention will now be described by way of example, with reference to the drawing, which accompanied the provisional specification and in which:

FIG. 1 is a chart illustrating a sequence of events in preparation for welding.

Referring now to the drawings, FIGS. 1a to 1g illustrate the stages in preparing for welding on a strip line flash welding machine basically as disclosed in our aforementioned patent applications. The welder is provided with main and auxiliary clamps 11 and 10 for the trailing edge of the old metal strip 14 and main and auxiliary clamps 12 and 13 for the leading edge of the new strip 15. Between the main clamps 11 and 12 is defined a clamp or shear position 16 and associated with the auxiliary clamps 10 and 13 are hydraulic units (not illustrated) for moving the auxiliary clamps relative to the main clamps. FIG. 1a illustrates the apparatus in the start position.

Figure 1B:
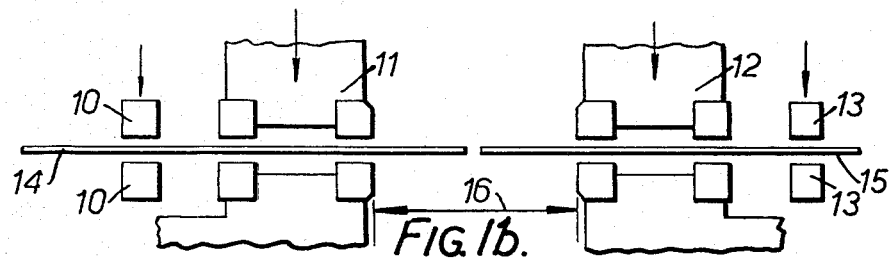

In FIG. 1b all the clamps are shown about to be closed, the ends of the strips having been located in the position 16 which in this embodiment is about 9 inches long, i.e., the space between the main clamps 11 and 12 is about 9 inches. The operator need only ensure that the ends each project at least about one inch into the position 16 to ensure shearing but this is an easy operation and requires little skill on the part of the operator.

Figure 1C:
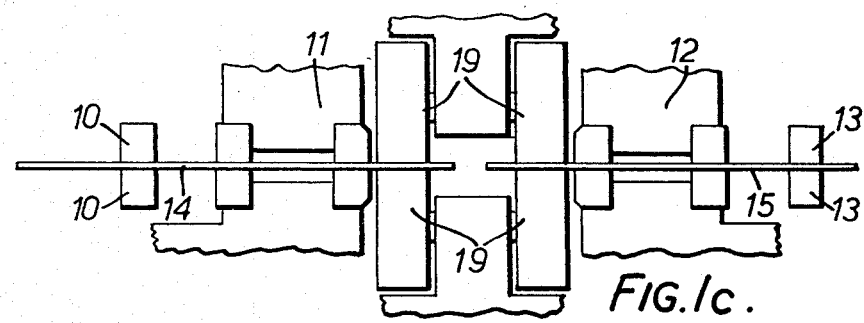

Cleaning now takes place, as shown in FIG. 1c. In this embodiment four rotating, laminated sanding wheels 19 coated with silicon carbide abrasive are used. The wheels are carried on the spindles of double ended drive motors, this assembly being supported from a fabricated steel beam structure more fully described in our aforementioned copending applications. The action of the passage of the sanding wheels through the welder die gap is to remove unwanted surface coatings from the material across the full width of the strip and for an area corresponding to the area of the clamping dies of the welder. The wheels being energised during the entry and exit strokes of the supporting beam to provide a two pass cleaning system.

Figure 1D:
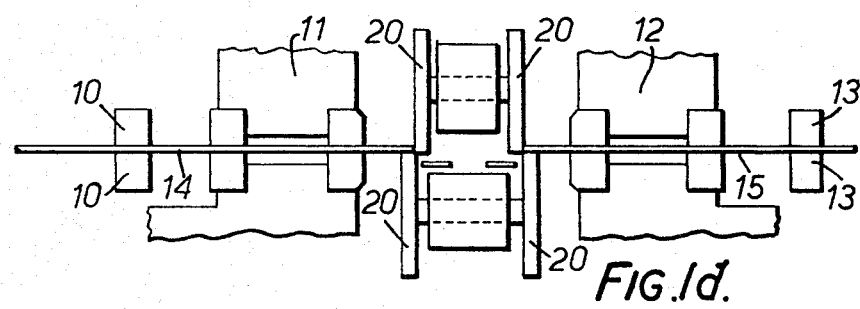
Figure 1E:
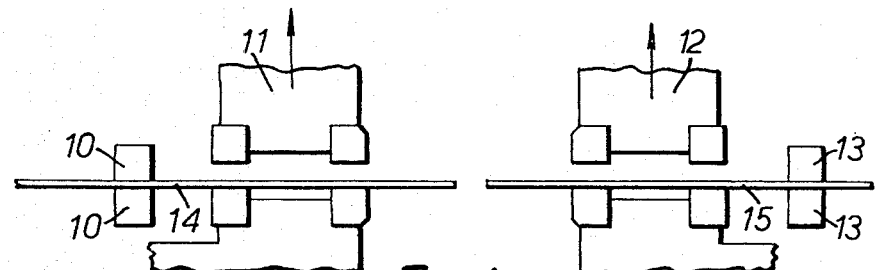

As shown in FIG. 1d a shearing unit is then activated to pass the cutting elements 20 through the position 16. As disclosed in the aforesaid applications the elements 20 pass horizontally through the position 16 rather than vertically as is customary.

Figure 1F:
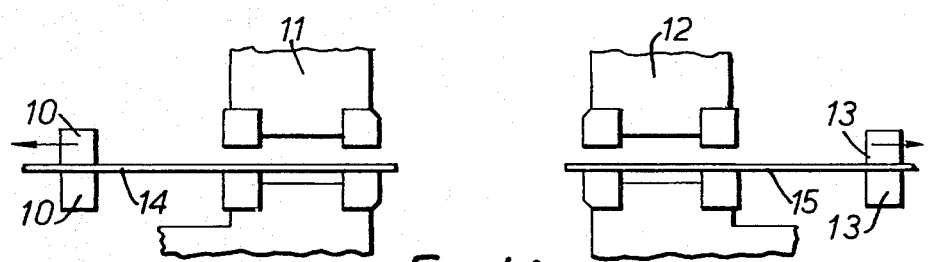

The main clamps 11 and 12 are then opened (FIG. 1e) and the hydraulic units are actuated to move the auxiliary clamps 10 and 13 relative to the main clamps so that the strip ends project a specified amount beyond the main clamps, FIG. 1f.

Figure 1G:
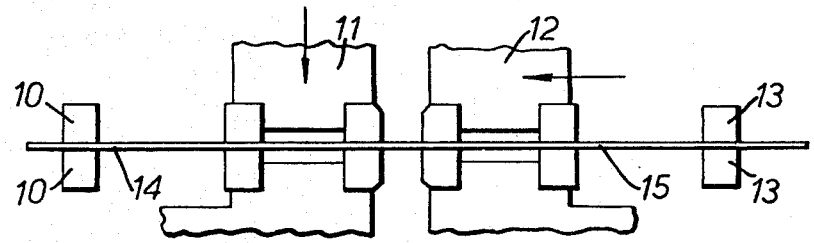

The main clamps are then closed again and in FIG. 1g the customary movement of the leading edge of the new strip 15 to abut the trailing edge of the old strip 14 to commence the flash welding is shown. This movement is achieved by movement of a platen (not illustrated), mounting the main and auxiliary clamps 12 and 13.

In this way accurate shearing and positioning relative to the main clamps 11 and 12 of the strip ends enables gauge bars to be dispensed with and allows the production of welds of consistently good quality.

The number and position of sanding wheels, of course, depends upon the particular design of welding machine to which the attachment is fitted, and while it is anticipated that two wheels only will be necessary operating on the underside of the strip to clean the lower surfaces of the leading and trailing ends, these facilities can, in some circumstances, be required to clean the upper surface of the strip ends only, or both upper and lower surfaces simultaneously or consecutively.

Similarly, the design of the supporting beam carrying the sanding wheels will depend upon the cleaning facilities required in any particular installation and can be a simple unit passing under the strip ends for cleaning the under surfaces of such strips, a simple beam structure passing above the strip ends for cleaning the upper surface of such strips or a 'C' frame structure where upper and lower cleaning facilities are required for any particular application.

In all cases, the speed at which the beam and cleaning means are traversed across the strip ends is to be controlled to allow adjustment to the optimum speed for any particular surface coating to be removed from the strip ends, and facilities for adjustment are included in the sanding wheel heads to compensate for wear of the wheel heads causing a reduction in the effective diameter of these units.

Instead of the laminated sanding wheels described above solid or flexible grinding wheels, sanding discs and sanding belts may also be used.

In view of the possibility that in certain circumstances surface coatings highly resistant to abrasive materials may be encountered, shot or sand blasting nozzles may be fitted to the leading end of the beam to remove surface coatings by the action of high speed metallic or granular particles directed towards the strip surface.

The invention has been described in terms of the strip line flash welder of the aforementioned applications. However, a self-contained cleaning unit may be provided for a conventional flash welder employing a gauge bar, the sequence of operations then being as follows:

The main and auxiliary clamps of the welder being open, the line operator decelerates and stops the trailing end of the strip in such a position that the pre-trimmed end from which scrap tags have been removed in the line shear, is positioned approximately in line with the welder exit dies.

The gauging unit is entered into the welder die gap.

The trailing end is reversed by line controls to locate the strip end against the datum surface of the gauging unit.

The line operator inches forward the pre-trimmed leading end of the new strip coil up to the appropriate surface of the gauge unit to accurately position the leading edge of the strip.

The strips ends are centered on the centre line of the entry section of the complete process line by means of strip centring units incorporated in the welder.

The main and auxiliary welding clamps are closed to secure the strip ends in the horizontal plane, and the gauging unit is retracted.

The cleaning head motors are energised to commence rotation of the cleaning wheels and energize the main beam to traverse the rotating cleaning wheels into the die gap of the welder, passing above, or below or above and below the strip according to the specific requirements of the installation and removing a band of surface coating from the strip across the full width of the strip.

On reaching its forward position the beam is decelerated and brought to rest, following which, the drive system to the beam is reversed to retract the beam out of the machine together with associated wheel heads and cleaning wheels.

Should the surface coating be highly resistant to abrasion the wheel heads can be energized during the retraction pass to apply a second cleaning operation to the strip surfaces.

On the completion of the retraction stroke the beam will be clear of the welder, allowing subsequent setting-up operations to be carried out as follows:

a. Main welder clamps open to release the strip ends.
b. Auxiliary clamp heads, presently engaged on the strip ends, traverse outwardly from the die gap along the controlling guideways to withdraw the strip ends into the welder.
c. Main clamps reclose onto strip ends.
d. Welder main carriage drive energised to close the wide clamp opening down to the reduced opening necessary for commencement of the automatic flashing sequence.
e. Carry out welding operations in known manner.

I claim:

1. A method of welding metal strips in a strip line flash welder, said strips passing through the welder in succession along a horizontal flow path with their broad surfaces disposed horizontally, the method including locating the ends of the metal strips in a clamp position, closing main and auxiliary clamps on each strip to retain the strip ends in the clamp position, cleaning areas of the broad surfaces of the strips adjacent their ends and thereafter shearing the strips between their respective ends and at least a large part of their cleaned areas without moving the strips, releasing the main clamps and adjusting the strips by moving the auxiliary clamps so that the new strip ends project beyond the main clamps by a predetermined amount, reclosing the main clamps on the cleaned areas of the strips to make electrical contact between strips and the main clamps and welding the strip ends together by abutting the strip ends while they remain clamped by at least the main clamps and passing electrical current between the strip ends, said current also flowing between the strips and the main clamps through the cleaned areas of the strips.

2. A method as claimed in claim 1, in which the broad surfaces of the strips near their ends are cleaned by passing cleaning means horizontally through the clamp position between the main clamps traversely of the strips.

3. A method as claimed in claim 2, in which the upper surfaces of the strip ends are cleaned.

4. A method as claimed in claim 3, in which the lower surfaces of the strip ends are cleaned.

5. A strip line flash welder comprising clamps operable to clamp the ends of metal strips in a clamp position, first and second pairs of clamps being provided for each strip end, said first pair serving as welding current electrodes, cleaning means operable while the strips are in the clamp position, to clean areas of the strips adjacent their ends, and shearing means operable while the strips are in the clamp position to shear the strip ends, said first and second pairs of clamps being independently operable and adjustable whereby the position of the strip end may be adjusted in the clamp position for engagement of said first pairs of clamps with said cleaned areas and means for moving the clamped strips together for flash butt welding.

6. A strip line flash welder as claimed in claim 5, in which the cleaning means is mounted on a beam structure which is mounted to pass horizontally through the clamp position.

7. A strip line flash welder as claimed in claim 6, in which the cleaning means is operable to clean the upper surfaces of clamped strip ends.

8. A strip line flash welder as claimed in claim 7, in which the cleaning means is operable to clean the lower surfaces of the clamped strip ends.

9. A strip line flash welder as claimed in claim 8, in which said cleaning means includes at least one pair of rotatable sanding wheels and drive means for rotating the sanding wheels.

10. A strip line flash welder as claimed in claim 9, in which said cleaning means includes at least one pair of nozzles for shot or sand blasting the strip ends to be cleaned.

* * * * *